US012809695B2

(12) United States Patent
You

(10) Patent No.: US 12,809,695 B2
(45) Date of Patent: Nov. 24, 2026

(54) METHOD FOR CROSS-APPLICATION PROCESSING FOR MULTIMEDIA CONTENT, AND ELECTRONIC DEVICE

(71) Applicant: VIVO MOBILE COMMUNICATION CO., LTD., Chang'an Dongguan (CN)

(72) Inventor: Chen You, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 685 days.

(21) Appl. No.: 17/975,960

(22) Filed: Oct. 28, 2022

(65) Prior Publication Data

US 2023/0051076 A1 Feb. 16, 2023

Related U.S. Application Data

(63) Continuation of application No. PCT/CN2021/089114, filed on Apr. 23, 2021.

(30) Foreign Application Priority Data

Apr. 30, 2020 (CN) ........................ 202010362777.8

(51) Int. Cl.
*G06F 9/54* (2006.01)
*G06F 16/435* (2019.01)

(52) U.S. Cl.
CPC ............ *G06F 9/542* (2013.01); *G06F 16/435* (2019.01)

(58) Field of Classification Search
None
See application file for complete search history.

(56) References Cited

U.S. PATENT DOCUMENTS

| | | | | |
|---|---|---|---|---|
| 2006/0274086 | A1* | 12/2006 | Forstall | G06T 11/00 345/629 |
| 2011/0047187 | A1* | 2/2011 | Sinha | H04M 7/0057 715/769 |
| 2013/0290982 | A1 | 10/2013 | Beilis et al. | |
| 2015/0113432 | A1 | 4/2015 | Jung et al. | |
| 2015/0365306 | A1* | 12/2015 | Chaudhri | H04N 21/47205 715/753 |

(Continued)

FOREIGN PATENT DOCUMENTS

| | | | |
|---|---|---|---|
| CN | 1677342 | A | 10/2005 |
| CN | 102819573 | A | 12/2012 |

(Continued)

OTHER PUBLICATIONS

Kuang et al.; English translation corresponding to CN 111061574 A1; Apr. 24, 2020; pp. 1-46. (Year: 2020).*

(Continued)

*Primary Examiner* — Umut Onat
(74) *Attorney, Agent, or Firm* — Fredrikson & Byron, P.A.

(57) ABSTRACT

A method for cross-application processing for multimedia content includes: displaying first identification information over an application icon of a first application in a floating manner, where the first identification information corresponds to first multimedia content in the first application; and performing target processing on the first multimedia content through a second application in a case that a first input for moving the first identification information to an application icon of the second application is received.

15 Claims, 5 Drawing Sheets

(56) References Cited

U.S. PATENT DOCUMENTS

| | | | | |
|---|---|---|---|---|
| 2017/0364235 | A1* | 12/2017 | Venkatesh | G06F 9/44505 |
| 2020/0034009 | A1* | 1/2020 | Sharma | G06F 3/0482 |
| 2022/0206995 | A1* | 6/2022 | Zadina | G06F 9/543 |

FOREIGN PATENT DOCUMENTS

| | | | |
|---|---|---|---|
| CN | 102968427 | A | 3/2013 |
| CN | 103294559 | A | 9/2013 |
| CN | 106844067 | A | 6/2017 |
| CN | 107273227 | A | 10/2017 |
| CN | 107506106 | A | 12/2017 |
| CN | 108415652 | A | 8/2018 |
| CN | 108563684 | A | 9/2018 |
| CN | 108804244 | A | 11/2018 |
| CN | 109933446 | A | 6/2019 |
| CN | 110196668 | A | 9/2019 |
| CN | 110750188 | A | 2/2020 |
| CN | 110851051 | A | 2/2020 |
| CN | 110909180 | A | 3/2020 |
| CN | 110913067 | A | 3/2020 |
| CN | 111026464 | A | 4/2020 |
| CN | 111061574 | A | 4/2020 |
| JP | 2007195826 | A | 8/2007 |

OTHER PUBLICATIONS

International Patent Application No. PCT/CN2021/089114, International Search Report and Written Opinion with Partial English Machine Translation mailed Jul. 22, 2021, 12 pages.

European Patent Office, “Extended European Search Report” from Application No. 21796633.2, dated Jul. 7, 2023, pp. 7.

* cited by examiner

METHOD FOR CROSS-APPLICATION PROCESSING FOR MULTIMEDIA CONTENT, AND ELECTRONIC DEVICE

CROSS-REFERENCE TO RELATED APPLICATIONS

This application is a continuation of International Application No. PCT/CN2021/089114, filed on Apr. 23, 2021, which claims priority to Chinese Patent Application No. 202010362777.8 filed in China on Apr. 30, 2020, which is incorporated herein by reference in its entirety.

TECHNICAL FIELD

The present disclosure relates to the field of communication technologies, and in particular to a method for cross-application processing for multimedia content, and an electronic device.

BACKGROUND

At present, electronic devices such as a mobile terminal have become an indispensable part of people's life as communication tools. Using applications to send multimedia content has become one of the most important communication methods for the electronic devices, such as sending text content, video content, and picture content. Correspondingly, the electronic devices can also receive the multimedia content through applications, and display the received multimedia content on interfaces of the applications.

In some application scenarios, a user may need to perform cross-application processing for multimedia content on an application. For example, multimedia content on application A is edited through application B. For another example, multimedia content edited by application B is forwarded through application C. In these application scenarios, generally, multimedia content on an application is saved locally, and then another application is opened and the multimedia content is selected for being processed.

It can be seen that, in the prior art, the cross-application processing for multimedia content applied to an electronic device is complicated.

SUMMARY

According to a first aspect of the present disclosure, a method for cross-application processing for multimedia content is provided, which is applied to an electronic device and includes:

displaying first identification information over an application icon of a first application in a floating manner, where the first identification information corresponds to first multimedia content in the first application; and performing target processing on the first multimedia content through a second application in a case that a first input for moving the first identification information to an application icon of the second application is received.

According to a second aspect of the present disclosure, an electronic device is provided, which includes:

a first display module, configured to display first identification information over an application icon of a first application in a floating manner, where the first identification information corresponds to first multimedia content in the first application; and a processing module, configured to perform target processing on the first multimedia content through a second application in a case that a first input for moving the first identification information to an application icon of the second application is received.

According to a third aspect of the present disclosure further provides an electronic device, including a processor, a memory, and a computer program stored in the memory and running on the processor, where when the computer program is executed by the processor, the steps of the foregoing method for cross-application processing for multimedia content are implemented.

According to a fourth aspect of the present disclosure, a computer readable storage medium storing a computer program is provided, where when the computer program is executed by a processor, the steps of the foregoing method for cross-application processing for multimedia content are implemented.

In the embodiments of the present disclosure, the first identification information is displayed over the application icon of the first application in a floating manner, and the first identification information corresponds to the first multimedia content in the first application; and target processing is performed on the first multimedia content through the second application in a case that the first input for moving the first identification information to the application icon of the second application is received.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

A method for cross-application processing for multimedia content provided by an embodiment of the present disclosure is mainly applied to an electronic device, the electronic device may be a mobile terminal and is used to perform cross-application processing on first multimedia content in a first application, so that cross-application processing on the multimedia content can be simplified.

The electronic device may be a mobile phone, a tablet personal computer, a laptop computer, a personal digital assistant (PDA), a mobile Internet device (MID), a wearable device, or the like.

Figure 1:
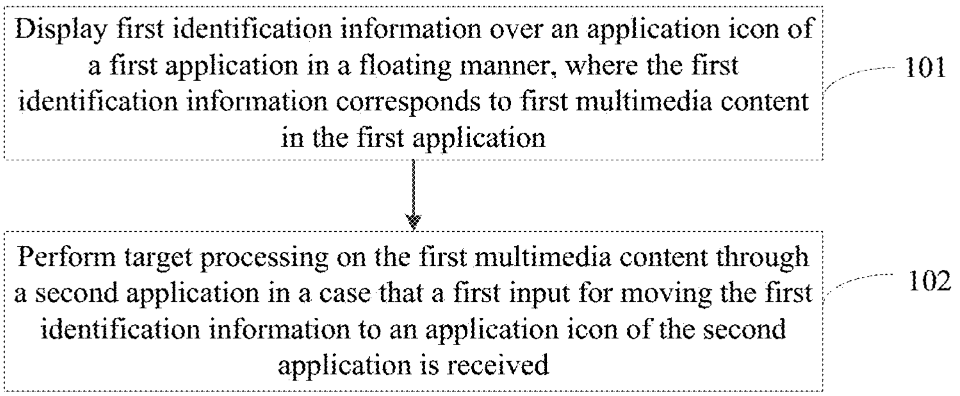
FIG. 1 is a flowchart of a method for cross-application processing for multimedia content according to an embodiment of the present disclosure.

Referring to FIG. 1, FIG. 1 is a flowchart of a method for cross-application processing for multimedia content according to an embodiment of the present disclosure. As shown in FIG. 1, the method includes the following steps.

Step 101: Display first identification information over an application icon of a first application in a floating manner, where the first identification information corresponds to first multimedia content in the first application.

In this embodiment, the first multimedia content may be a picture, a video, or a text, which is not specifically limited herein. In the following embodiment, the first multimedia content will be described in detail by taking a picture as an example.

The first identification information corresponds to the first multimedia content in the first application, where the first multimedia content may be one of the following:

edited multimedia content in the first application; or multimedia content in an interface of the first application.

Alternatively, the first application may be an application for editing multimedia content, and in this case, the first multimedia content may be the edited multimedia content in the first application. It should be noted that a type of the first application may correspond to the multimedia content. For example, in a case that the multimedia content is a picture, the first application may be an image processing application.

After the multimedia content is edited by the first application to obtain the first multimedia content, the first identification information may be displayed over the application icon of the first application in a floating manner. The first identification information may be identifiers such as a thumbnail or a partial image of the first multimedia content.

Alternatively, after the multimedia content is edited by the first application to obtain the first multimedia content, in a case that a return input for the first application is received, in response to the return input, the interface of the first application is switched to a desktop of the electronic device, and the first identification information is displayed over the application icon of the first application in a floating manner.

The first application may also be a communication application, and in this case, the first multimedia content may be multimedia content displayed in the interface of the first application. After the first multimedia content is selected in the interface of the first application, the first identification information may be displayed over the application icon of the first application in a floating manner.

Other identification information, in addition to the first identification information may be displayed over the application icon of the first application in a floating manner. Such identification information may correspond to other multimedia content other than first multimedia content. Other multimedia content may be the edited multimedia content in the first application. For example, if a user edits several pictures or videos in the first application simultaneously, after the user returns to the first application, multiple pieces of identification information may be displayed over the application icon of the first application separately. Other multimedia content may also be the multimedia content in the interface of the first application. For example, if the user selects multiple pictures or videos in the first application simultaneously, after the user returns to the first application, multiple pieces of identification information may be displayed over the application icon of the first application.

In a case that multiple pieces of identification information are displayed over the application icon of the first application in a floating manner, the user can select and process multimedia content corresponding to the multiple pieces of identification information. If the user drags a piece of identification information, the electronic device can perform cross-application processing for multimedia content corresponding to the identification information. During dragging, the user can drag only one piece of identification information or can drag multiple pieces of identification information simultaneously. In a case that the user drags multiple pieces of identification information simultaneously, the electronic device can simultaneously perform cross-application processing on the multimedia content corresponding to the multiple pieces of identification information.

In addition, the user can choose to perform different types of cross-application processing on the multimedia content corresponding to the multiple pieces of identification information displayed over the application icon of the first application in a floating manner. For example, the user can choose to drag the identification information to a communication application, and correspondingly, the electronic device can forward multimedia content corresponding to the identification information. For another example, the user can also choose to drag the identification information to an application for editing multimedia content, and correspondingly, the electronic device can edit multimedia content corresponding to the identification information.

Step 102: Perform target processing on the first multimedia content through a second application in a case that a first input for moving the first identification information to an application icon of the second application is received.

The second application may be a communication application or an image processing application. The performing target processing on the first multimedia content through a second application may be forwarding the first multimedia content through the second application, or may be editing the first multimedia content through the second application.

It should be noted that the way of performing target processing on the first multimedia content through the second application corresponds to a type of the second application. For example, if the second application is a communication application, the target processing is forwarding. For another example, if the second application is an image processing application, the target processing is editing.

The first input may be a voice input, a somatosensory input, or a touch input. The touch input may include a double-click operation, a multi-click operation, a drag operation, and the like. In the following embodiment, the first input will be described by taking the drag operation as an example.

Alternatively, the electronic device can detect a drag operation for the first identification information displayed over the application icon of the first application in a floating manner, and in a case that the first input for dragging the first identification information to an application icon of the second application is received, the electronic device performs target processing on the first multimedia content through the second application. Alternatively, if the second application is a communication application, the first multimedia content is forwarded through the second application, and if the second application is an image processing application, the first multimedia content is edited through the second application.

In a case that the second application is not started, the electronic device needs to start the second application, and perform target processing on the first multimedia content through the second application.

In this embodiment, the first identification information is displayed over the application icon of the first application in a floating manner, and the first identification information corresponds to the first multimedia content in the first application; and target processing is performed on the first multimedia content through the second application in a case that the first input for moving the first identification information to the application icon of the second application is received.

This way, by moving the first identification information displayed over the application icon of the first application in a floating manner and corresponding to the first multimedia content in the first application to the application icon of the second application, target processing on the first multimedia content can be performed through the second application, so that cross-application processing on the multimedia content can be simplified, and then cross-application processing on the multimedia content can be quickly implemented.

Optionally, based on the first embodiment, step 102 includes:

displaying an interface of the second application including contact information, and forwarding the first multimedia content to a target contact, in a case that the first input for moving the first identification information to the application icon of the second application is received, where the target contact is a contact determined in the interface.

In this embodiment, in a case the first input for moving the first identification information to the application icon of the second application is received, an interface of the second application for displaying the contact information is directly switched to. Compared with the prior art in which a main interface of the second application is displayed first and then switch from the main interface to the interface including the contact information is performed, forwarding efficiency of the multimedia content can be improved in this embodiment.

Optionally, based on the first embodiment, before step 101, the method further includes:

displaying second multimedia content in an interface of a target application, where the target application is the second application or a third application; and editing the second multimedia content through the first application in a case that a second input for moving the second multimedia content to the application icon of the first application is received, to obtain the first multimedia content.

In this embodiment, two corresponding forwarding scenarios can be provided. In an optional embodiment, after the second multimedia content displayed in the interface of the second application is edited through the first application to obtain the first multimedia content, the first multimedia content may be forwarded to the target contact through the second application again. For example, multimedia content displayed in an interface corresponding to contact A of application A is edited and forwarded to contact B of the application A.

In another optional embodiment, after the second multimedia content displayed in an interface of the third application is edited through the first application to obtain the first multimedia content, the first multimedia content may be forwarded to the target contact through the second application. For example, multimedia content displayed in an interface corresponding to contact C of application C is edited and forwarded to contact B of application A.

The second input may be a voice input, a somatosensory input, or a touch input. The touch input may include a double-click operation, a multi-click operation, a drag operation, and the like. In the following embodiment, the second input will be described by taking the drag operation as an example.

In a case that the second input for dragging the second multimedia content to the application icon of the first application is received, the electronic device starts the first application, and imports the second multimedia content into the first application, so as to edit the second multimedia content and obtain the first multimedia content.

In an optional embodiment, the electronic device includes a foldable screen, and the electronic device can expand the foldable screen by utilizing a folding characteristic of the screen. Half of the screen displays the interface of the target application, and the other half of the screen displays a desktop application. In this scenario, the second multimedia content in the interface of the target application can be directly dragged to the application icon of the first application on the desktop.

In another optional embodiment, for a waterfall display or a full screen, the second input includes a first operation and a second operation of continuously dragging the second multimedia content; and the editing the second multimedia content through the first application in a case that a second input for moving the second multimedia content to the application icon of the first application is received, to obtain the first multimedia content includes:

switching the interface of the target application to a desktop of the electronic device in a case that the first operation of dragging the second multimedia content to a preset area is received; and editing the second multimedia content through the first application corresponding to an application icon on a target location, in a case that the second operation of dragging the second multimedia content to the target position on the desktop is received, to obtain the first multimedia content, where the target position is a position corresponding to an application icon on the desktop.

The preset area can be set according to an actual situation. For example, for the full screen, in a case that an operation of dragging the second multimedia content in the interface of the target application out of two sides of the screen, such as edges of left and right sides, and out of the screen, is received, the interface of the target application is switched to the desktop of the electronic device.

For another example, for the waterfall display, in a case that an operation of dragging the second multimedia content in the interface of the target application to a waterfall area on both sides of the screen is received, the interface of the target application is switched to the desktop of the electronic device.

Further, after the desktop of the electronic device is switched to, dragging of the second multimedia content is continuously detected, and in a case that a second operation of dragging the second multimedia content to the application icon of the first application on the desktop is received, the first application is started, and the second multimedia content is imported into the first application.

In this embodiment, by dragging the second multimedia content in the interface of the target application to the application icon of the first application, the first application can be directly started, and the second multimedia content can be imported into the first application for being edited. Compared with the prior art in which the second multimedia content in the interface of the target application is downloaded locally, and then the first application is opened to edit the second multimedia content, in this embodiment, the forwarding on the multimedia content can be simplified, and the first application is quickly started to edit the second multimedia content, so that forwarding on the multimedia content can be implemented quickly.

Optionally, the editing the second multimedia content through the first application in a case that a second input for moving the second multimedia content to the application icon of the first application is received, to obtain the first multimedia content includes:

determining, in a case that the second input for moving the second multimedia content to the application icon of the first application is received, whether the first application is a first preset application; and editing the second multimedia content through the first application in a case that the first application is the first preset application, to obtain the first multimedia content.

The first preset application may be a processing application corresponding to the second multimedia content. For example, if the second multimedia content is a picture, the first preset application is an image processing application. If the second multimedia content is a video, the first preset application is a video processing application.

In this embodiment, only in a case that the first application is the first preset application, the first application is started, and the second multimedia content is imported into the first application, so as to edit the second multimedia content, so that the first multimedia content can be obtained. Thus, it can be prevented that the user starts other applications in a case of misoperation.

Optionally, after the determining whether the first application is a first preset application, the method further includes:

forwarding the first multimedia content through the first application in a case that the first application is not the first preset application but is a second preset application.

The second preset application may be a communication application. In an application scenario, the user can directly forward the second multimedia content without editing the second multimedia content. In this case, in a case that the second input for moving the second multimedia content to the application icon of the first application is received, the first application is started, and the first multimedia content is forwarded through the first application. This way, it is only required that the second multimedia content on the interface of the target application is directly dragged to the application icon of the first application, so that forwarding on the multimedia content can be implemented, and then forwarding on the multimedia content can be simplified.

Optionally, step 102 includes:

forwarding the first multimedia content through the second application in a case that the first input for moving the first identification information to the application icon of the second application is received and if the second application is a second preset application.

In this embodiment, only in a case that the second application is the second preset application, the first multimedia content is forwarded through the second application. Thus, it can be prevented that the user starts other applications in a case of misoperation.

Optionally, step 102 includes:

editing the first multimedia content through the second application in a case that the first input for moving the first identification information to the application icon of the second application is received, and if the second application is not a second preset application but is a first preset application.

In an application scenario, after editing and obtaining the first multimedia content through the first application, the user may also need to edit the first multimedia content again through another processing application. In this case, in a case that the first input for moving the first identification information to the application icon of the second application is received, if the second application is not the second preset application but is the first preset application, the first multimedia content is edited again through the second application.

In order to determine a scene for multiple times of editing, in a case that the first input for moving the first identification information to the application icon of the second application is received, the electronic device can output reminder information to remind the user whether to start the second application to edit the first multimedia content again.

In a case that the second application is determined to be started according to the reminder information, the second application is started to edit the first multimedia content again, and after editing, identification information of edited multimedia content can be displayed over the application icon of the second application in a floating manner. Afterwards, target processing may be performed on the multimedia content with respect to the identification information displayed over the application icon of the second application in a floating manner. This way, in this embodiment, the multimedia content can be dragged in order to be edited for multiple times, so that cross-application processing on the multimedia content can be simplified, and cross-application processing on the multimedia content can be further implemented quickly.

It should be noted that the multiple optional implementation manners described in this embodiment of the present disclosure may be implemented in combination with each other, or may be separately implemented. This is not limited in this embodiment of the present disclosure.

To better understand the whole process, the following describes the method for cross-application processing for multimedia content provided in an embodiment of the present disclosure in an application scenario in which the multimedia content is used as a picture.

Alternatively, a screen of the electronic device is a full screen, and the user needs to forward a picture displayed in an interface of application A to application C after the picture is edited by application B.

Figure 2:
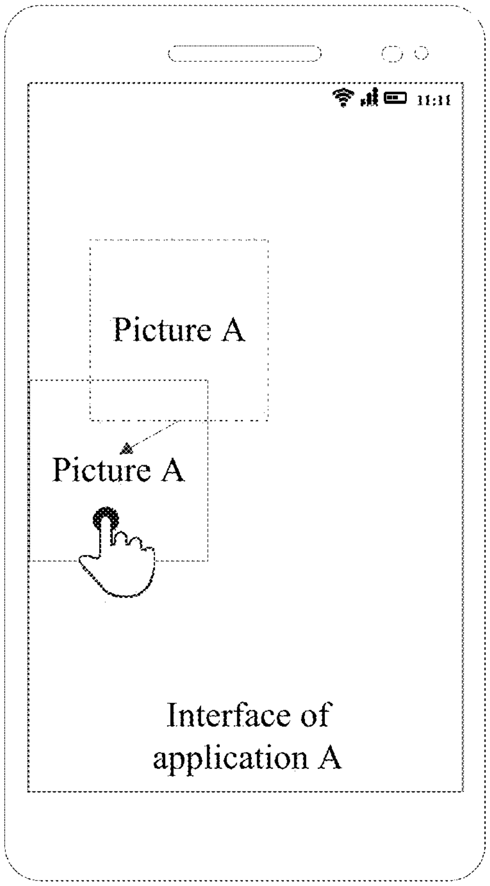
FIG. 2 is a schematic operation diagram of a picture displayed in a dragging interface.

First, referring to FIG. 2, FIG. 2 is a schematic operation diagram of dragging a picture displayed in an interface. As shown in FIG. 2, the user drags picture A displayed in an interface of the application A to left and right edges of a screen, and in a case that the picture is dragged out of the screen, the electronic device switches the interface of the application A to a desktop of the electronic device.

Afterwards, the user continues to drag the picture A to an application icon of the application B on the desktop. In this case the electronic device starts the application B and imports the picture A into the application B.

Figure 3:
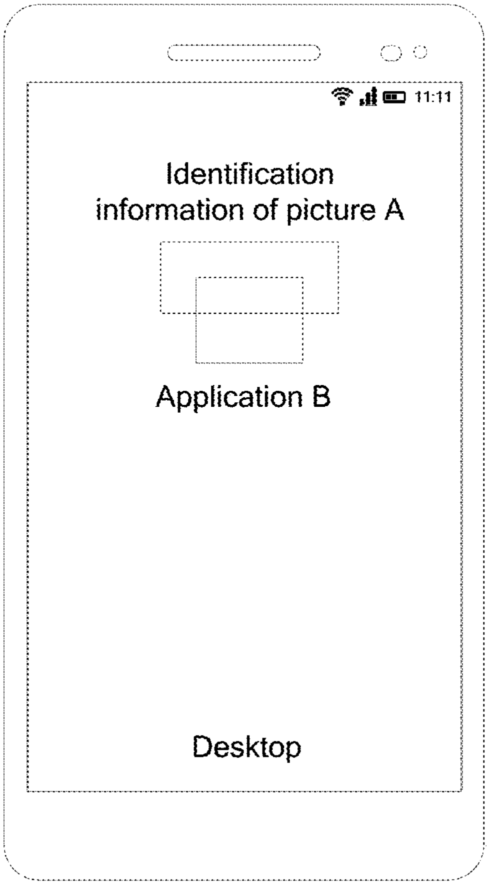
FIG. 3 is a schematic diagram of display of identification information of an edited picture on an application icon.

Next, after the picture A is edited by the application B, the user clicks a return button. In this case, the electronic device displays in a floating manner identification information of an edited picture A over the application icon of the application B, as shown in FIG. 3.

Figure 4:
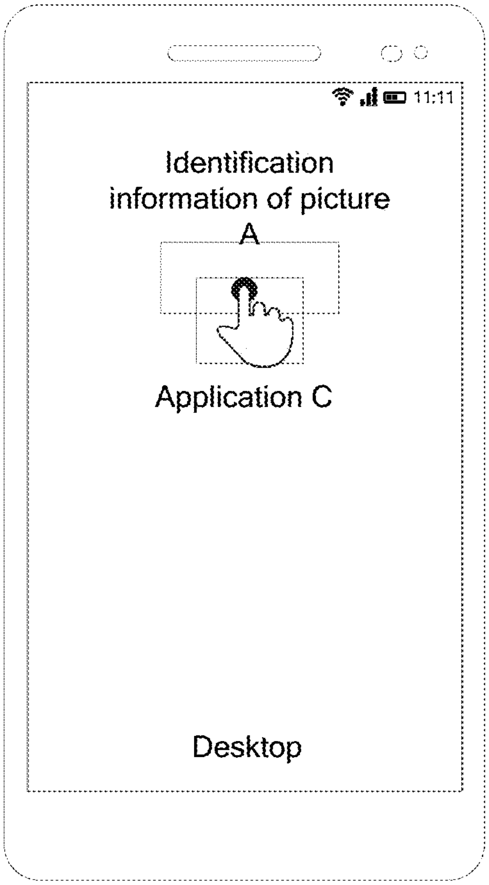
FIG. 4 is a schematic operation diagram of dragging the identification information of the edited picture to another application.

Then, the user continues to drag the identification information of the edited picture A to an application icon of the application C, as shown in FIG. 4. In this case, an interface of the application C including contact information pops up.

Finally, after the user selects a target contact in the interface including the contact information, the electronic device forwards the edited picture A to the target contact selected by the user.

The electronic device provided by an embodiment of the present disclosure will be described in detail below.

Figure 5:
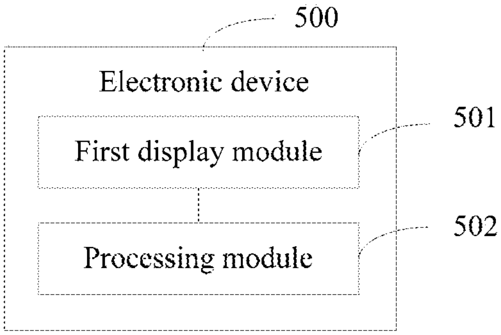
FIG. 5 is a first structural diagram of an electronic device according to an embodiment of the present disclosure.

Referring to FIG. 5, FIG. 5 is a first structural diagram of an electronic device according to an embodiment of the present disclosure. As shown in FIG. 5, the electronic device 500 includes:

- a first display module 501, configured to display first identification information over an application icon of a first application in a floating manner, where the first identification information corresponds to first multimedia content in the first application; and
- a processing module 502, configured to perform target processing on the first multimedia content through a second application in a case that a first input for moving the first identification information to an application icon of the second application is received.

Optionally, the processing module 502 is further configured to display an interface of the second application including contact information and forward the first multimedia content to a target contact, in a case that the first input for moving the first identification information to the application icon of the second application is received, where the target contact is a contact determined in the interface.

Figure 6:
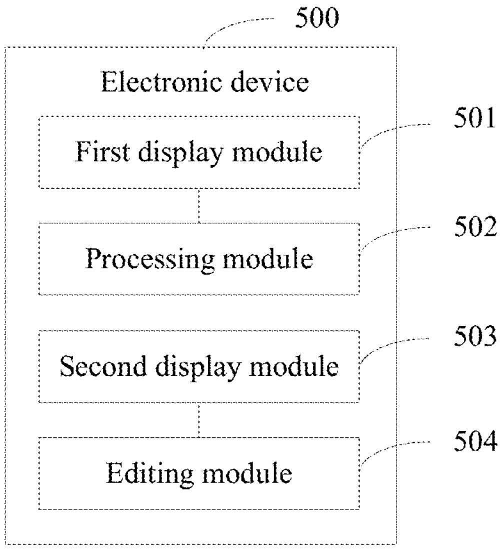
FIG. 6 is a second structural diagram of an electronic device according to an embodiment of the present disclosure.

Optionally, referring to FIG. 6, FIG. 6 is a second structural diagram of the electronic device according to an embodiment of the present disclosure. As shown in FIG. 6, based on the embodiment shown in FIG. 5, the electronic device 500 further includes:

- a second display module 503, configured to display second multimedia content in an interface of a target application, where the target application is the second application or a third application; and
- an editing module 504, configured to edit the second multimedia content through the first application in a case that a second input for moving the second multimedia content to the application icon of the first application is received, to obtain the first multimedia content.

Optionally, the second input includes a first operation and a second operation of continuously dragging the second multimedia content.

The editing module 504 includes:

- a switching unit, configured to switch the interface of the target application to a desktop of the electronic device in a case that the first operation of dragging the second multimedia content to a preset area is received; and
- an editing unit, configured to edit the second multimedia content through the first application corresponding to an application icon on a target location, in a case that the second operation of dragging the second multimedia content to the target position on the desktop is received, to obtain the first multimedia content, where the target position is a position corresponding to an application icon on the desktop.

Optionally, the editing module 504 is further configured to determine, in a case that the second input for moving the second multimedia content to the application icon of the first application is received, whether the first application is a first preset application; and edit the second multimedia content through the first application in a case that the first application is the first preset application, to obtain the first multimedia content.

Figure 7:
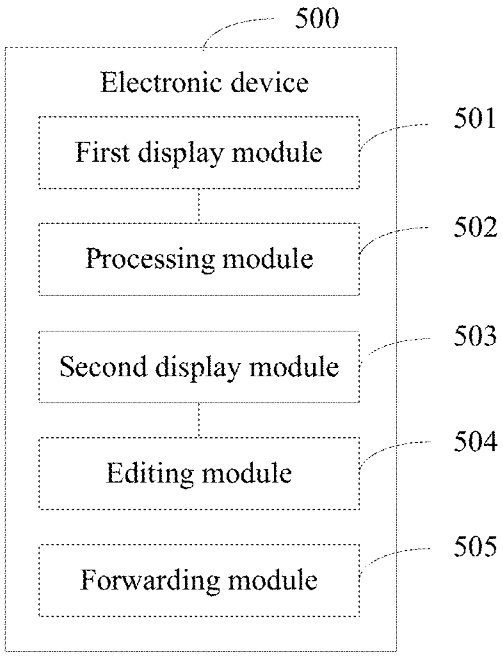
FIG. 7 is a third structural diagram of an electronic device according to an embodiment of the present disclosure.

Optionally, referring to FIG. 7, FIG. 7 is a third structural diagram of an electronic device according to an embodiment of the present disclosure. As shown in FIG. 7, based on the embodiment shown in FIG. 6, the electronic device 500 further includes:

- a forwarding module 505, configured to forward the first multimedia content through the first application in a case that the first application is not the first preset application but is a second preset application.

Optionally, the processing module 502 is further configured to forward the first multimedia content through the second application in a case that the first input for moving the first identification information to the application icon of the second application is received and if the second application is the second preset application.

Optionally, the processing module 502 is further configured to edit the first multimedia content through the second application in a case that the first input for moving the first identification information to the application icon of the second application is received, and if the second application is not the second preset application but is the first preset application.

The electronic device provided in this embodiment of the present disclosure can implement the processes implemented by the electronic device in the foregoing method embodiment. To avoid repetition, details are not described herein again.

Figure 8:
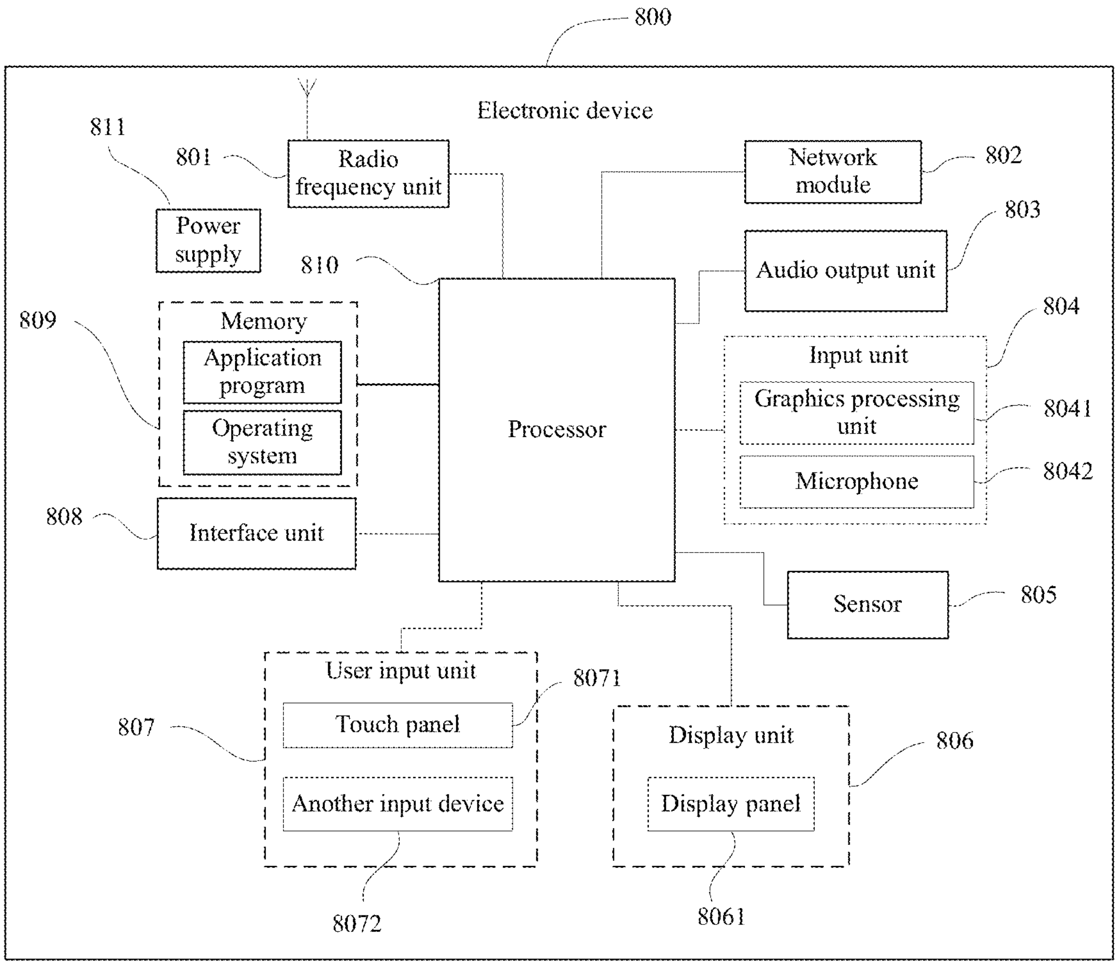
FIG. 8 is a schematic structural diagram of hardware of an electronic device for implementing the embodiments of the present disclosure.

The electronic device may be a mobile terminal. FIG. 8 is a schematic structural diagram of hardware of an electronic device for implementing embodiments of the present disclosure.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the electronic device shown in FIG. 8 constitutes no limitation on the electronic device, and the electronic device may include more or fewer components than those shown in the figure, or have a combination of some components, or have a different component arrangement. In this embodiment of the present application, the electronic device includes but is not limited to a mobile phone, a tablet computer, a notebook computer, a palmtop computer, an in-vehicle terminal, a wearable device, a pedometer, and the like.

The display module 806 is configured to display first identification information over an application icon of a first application in a floating manner, where the first identification information corresponds to first multimedia content in the first application; and the processor 810 is configured to perform target processing on the first multimedia content through a second application in a case that a first input for moving the first identification information to an application icon of the second application is received.

The processor 810 is further configured to:

display an interface of the second application including contact information, and forward the first multimedia content to a target contact, in a case that the first input for moving the first identification information to the application icon of the second application is received, where the target contact is a contact determined in the interface.

Optionally, the display unit 806 is further configured to display second multimedia content in an interface of a target application, where the target application is the second application or a third application; and the processor 810 is further configured to edit the second multimedia content through the first application in a case that a second input for moving the second multimedia content to the application icon of the first application is received, to obtain the first multimedia content.

Optionally, the second input includes a first operation and a second operation of continuously dragging the second multimedia content.

The processor 810 is further configured to:

switch the interface of the target application to a desktop of the electronic device in a case that the first operation of dragging the second multimedia content to a preset area is received; and edit the second multimedia content through the first application corresponding to an application icon on a target location, in a case that the second operation of dragging the second multimedia content to the target position on the desktop is received, to obtain the first multimedia content, where the target position is a position corresponding to an application icon on the desktop. Optionally, the processor 810 is further configured to:

determine, in a case that the second input for moving the second multimedia content to the application icon of the first application is received, whether the first application is a first preset application; and edit the second multimedia content through the first application in a case that the first application is the first preset application, to obtain the first multimedia content.

Optionally, the processor 810 is further configured to:

forward the first multimedia content through the first application in a case that the first application is not the first preset application but is a second preset application.

Optionally, the processor 810 is further configured to:

forward the first multimedia content through the second application in a case that the first input for moving the first identification information to the application icon of the second application is received and if the second application is a second preset application.

Optionally, the processor 810 is further configured to:

edit the first multimedia content through the second application in a case that the first input for moving the first identification information to the application icon of the second application is received, and if the second application is not a second preset application but is a first preset application.

It should be understood that, in this embodiment of the present application, the radio frequency unit 801 may be configured to receive and send information or receive and send a signal in a call process. Alternatively, after downlink data from a base station is received, the processor 810 processes the downlink data. In addition, uplink data is sent to the base station. Usually, the radio frequency unit 801 includes but is not limited to an antenna, at least one amplifier, a transceiver, a coupler, a low noise amplifier, a duplexer, and the like. In addition, the radio frequency unit 801 may also communicate with a network and another device through a wireless communications system.

The electronic device provides users with wireless broadband Internet access through the network module 802, for example, helps users receive and send e-mails, browse web pages, and access streaming media.

The audio output unit 803 may convert audio data received by the radio frequency unit 801 or the network module 802 or stored in the memory 809 into an audio signal and output the audio signal as a sound. Moreover, the audio output unit 803 can further provide audio output related to a specific function performed by the electronic device 800 (for example, call signal received sound and message received sound). The audio output unit 803 includes a loudspeaker, a buzzer, a telephone receiver, and the like.

The input unit 804 is configured to receive an audio signal or a video signal. The input unit 804 may include a graphics processing unit (GPU) 8041 and a microphone 8042. The graphics processing unit 8041 is used to process image data of a static picture or a video obtained by an image capturing device (for example, a camera) in a video capturing mode or an image capturing mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive sound and can process such sound into audio data. The processed audio data may be converted in a call mode into a format that can be sent by the radio frequency unit 801 to a mobile communication base station for outputting.

The electronic device 800 further includes at least one sensor 805, for example, a light sensor, a motion sensor, and another sensor. Alternatively, the light sensor includes an ambient light sensor and a proximity sensor. The ambient light sensor may adjust luminance of the display panel 8061 based on brightness of ambient light. The proximity sensor may turn off the display panel 8061 and/or backlight when the electronic device 800 moves close to an ear. As a motion sensor, an accelerometer sensor may detect magnitude of acceleration in various directions (usually three axes), may detect magnitude and the direction of gravity when stationary, may be configured to identify electronic devices' postures (such as switching between a landscape mode and a portrait mode, related games, and magnetometer posture calibration), may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein again.

The display unit 806 is configured to display information input by a user or information provided for a user. The display unit 806 may include the display panel 8061, and the display panel 8061 may be configured in a form of a liquid crystal display (LCD), an organic light-emitting diode (OLED), or the like.

The user input unit 807 may be configured to: receive entered digital or character information, and generate key signal input related to a user setting and function control of the electronic device. Alternatively, the user input unit 807 includes a touch panel 8071 and another input device 8072. The touch panel 8071 is also referred to as a touchscreen, and may collect a touch operation performed by a user on or near the touch panel 8071 (for example, an operation performed by a user on or near the touch panel 8071 by using any proper object or accessory, for example, a finger or a stylus). The touch panel 8071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 810, and receives and executes a command sent by the processor 810. In addition, the touch panel 8071 may be implemented in various types such as a resistor, a capacitor, an infrared ray, or a surface acoustic wave. The user input unit 807 may include another input device 8072 in addition to the touch panel 8071. Alternatively, the another input device 8072 may include but is not limited to: a physical keyboard, function keys (for example, a volume control key and an on/off key), a trackball, a mouse, or a joystick. Details are not described herein.

Further, the touch panel 8071 may cover the display panel 8061. After detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. Although in FIG. 8, the touch panel 8071 and the display panel 8061 are configured as two independent components to implement input and output functions of the electronic device, in some embodiments, the touch panel 8071 and the display panel 8061 can be integrated to implement the input and output functions of the electronic device. Details are not limited herein.

The interface unit 808 is an interface for connecting an external apparatus with the electronic device 800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 808 may be configured to receive an input (for example, data information and power) from an external apparatus and transmit the received input to one or more elements in the electronic device 800 or may be configured to transmit data between the electronic device 800 and the external apparatus.

The memory 809 may be configured to store a software program and various pieces of data. The memory 809 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 809 may include a high-speed random access memory, and may further include a nonvolatile memory, for example, at least one magnetic disk storage device, a flash storage device, or another volatile solid-state storage device.

The processor 810 is a control center of the electronic device, connects all parts of the entire electronic device by using various interfaces and lines, and performs various functions of the electronic device and data processing by running or executing a software program and/or a module that are/is stored in the memory 809 and by invoking data stored in the memory 809, to overall monitor the electronic device. The processor 810 may include one or more processing units. Preferably, an application processor and a modem processor may be integrated into the processor 810. The application processor mainly processes an operating system, a user interface, an application program, and the like. The modem processor mainly processes wireless communications. It can be understood that, alternatively, the modem processor may not be integrated into the processor 810.

The electronic device 800 may further include the power supply 811 (such as a battery) supplying power to each component. Preferably, the power supply 811 may be logically connected to the processor 810 by using a power management system, so as to implement functions such as charging management, discharging management, and power consumption management by using the power management system.

In addition, the electronic device 800 includes some functional modules not shown. Details are not described herein again.

Preferably, an embodiment of the present disclosure further provides an electronic device, including a processor 810, a memory 809, and a computer program stored in the memory 809 and capable of running on the processor 810. When the computer program is executed by the processor 810, the foregoing processes of the method for cross-application processing on the multimedia content are implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the method for cross-application processing on the multimedia content are implemented and a same technical effect can be achieved. To avoid repetition, details are not described herein again. The computer-readable storage medium includes a read-only memory (ROM), a random access memory (RAM), a magnetic disk, or an optical disc.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods for each particular application to implement the described functions, but such implementation shall not be considered to be outside the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the parts or units may be selected according to actual needs to achieve the objectives of the solutions of the examples.

In addition, functional units in the embodiments of the present disclosure may be integrated into one processing unit, or each unit may exist separately physically, or two or more units may be integrated into one unit.

The function may be stored in a computer readable storage medium if it is implemented in the form of a software functional unit and sold or used as an independent product. Based on such understanding, the technical solution, or the part contributing to the prior art or the part of the technical solution may be essentially embodied in the form of software products. The computer software products are stored in one storage medium and includes several instructions for enabling one computer device (which may be a personal computer, a server or a network device) to perform all or some of the steps of the method according to the embodiments of the present disclosure. The foregoing storage medium includes various media that can store a program code such as a USB flash disk, a mobile hard disk, a ROM, a RAM, a magnetic disk, an optical disc, or the like.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A method for cross-application processing for multimedia content performed by an electronic device, comprising:

displaying first identification information over an application icon of a first application in a floating manner, wherein the first identification information corresponds to first multimedia content in the first application, and the first multimedia content is edited by the first application; and performing target processing on the first multimedia content through a second application in a case that a first input for moving the first identification information to an application icon of the second application is received;

wherein before the displaying first identification information over the application icon of the first application in the floating manner, the method further comprises: displaying second multimedia content in an interface of a target application, wherein the target application is the second application or a third application; and editing the second multimedia content through the first application in a case that a second input for moving the second multimedia content to the application icon of the first application is received, to obtain the first multimedia content;

wherein the second input comprises a first operation and a second operation of continuously dragging the second multimedia content;

the editing the second multimedia content through the first application in the case that the second input for moving the second multimedia content to the application icon of the first application is received, to obtain the first multimedia content comprises:

switching the interface of the target application to a desktop of the electronic device in a case that the first operation of dragging the second multimedia content to a preset area is received; and editing the second multimedia content through the first application corresponding to an application icon on a target location, in a case that the second operation of dragging the second multimedia content to the target position on the desktop is received, to obtain the first multimedia content, wherein the target position is a position corresponding to an application icon on the desktop.

2. The method according to claim 1, wherein the performing target processing on the first multimedia content through the second application in the case that the first input for moving the first identification information to the application icon of the second application is received comprises:

displaying an interface of the second application comprising contact information, and forwarding the first multimedia content to a target contact, in a case that the first input for moving the first identification information to the application icon of the second application is received, wherein the target contact is a contact determined in the interface.

3. The method according to claim 1, wherein the editing the second multimedia content through the first application in the case that the second input for moving the second multimedia content to the application icon of the first application is received, to obtain the first multimedia content comprises:

determining, in a case that the second input for moving the second multimedia content to the application icon of the first application is received, whether the first application is a first preset application; and editing the second multimedia content through the first application in a case that the first application is the first preset application, to obtain the first multimedia content.

4. The method according to claim 3, wherein after the determining whether the first application is the first preset application, the method further comprises:

forwarding the first multimedia content through the first application in a case that the first application is not the first preset application but is a second preset application.

5. The method according to claim 1, wherein the performing target processing on the first multimedia content through the second application in the case that the first input for moving the first identification information to the application icon of the second application is received comprises:

forwarding the first multimedia content through the second application in a case that the first input for moving the first identification information to the application icon of the second application is received and the second application is a second preset application.

6. The method according to claim 1, wherein the performing target processing on the first multimedia content through the second application in the case that the first input for moving the first identification information to the application icon of the second application is received comprises:

editing the first multimedia content through the second application in a case that the first input for moving the first identification information to the application icon of the second application is received, and the second application is not a second preset application but is a first preset application.

7. An electronic device, comprising:

a processor; and a memory storing a computer program that is executable by the processor, wherein the computer program, when executed by the processor, causes the electronic device to perform the following steps:

displaying first identification information over an application icon of a first application in a floating manner, wherein the first identification information corresponds to first multimedia content in the first application, and the first multimedia content is edited by the first application; and performing target processing on the first multimedia content through a second application in a case that a first input for moving the first identification information to an application icon of the second application is received;

wherein before the displaying first identification information over the application icon of the first application in the floating manner, the method further comprises: displaying second multimedia content in an interface of a target application, wherein the target application is the second application or a third application; and editing the second multimedia content through the first application in a case that a second input for moving the second multimedia content to the application icon of the first application is received, to obtain the first multimedia content;

wherein the second input comprises a first operation and a second operation of continuously dragging the second multimedia content;

the editing the second multimedia content through the first application in the case that the second input for moving the second multimedia content to the application icon of the first application is received, to obtain the first multimedia content comprises:

switching the interface of the target application to a desktop of the electronic device in a case that the first operation of dragging the second multimedia content to a preset area is received; and editing the second multimedia content through the first application corresponding to an application icon on a target location, in a case that the second operation of dragging the second multimedia content to the target position on the desktop is received, to obtain the first multimedia content, wherein the target position is a position corresponding to an application icon on the desktop.

8. The electronic device according to claim 7, wherein the performing target processing on the first multimedia content through the second application in the case that the first input for moving the first identification information to the application icon of the second application is received comprises:

displaying an interface of the second application comprising contact information, and forwarding the first multimedia content to a target contact, in a case that the first input for moving the first identification information to the application icon of the second application is received, wherein the target contact is a contact determined in the interface.

9. The electronic device according to claim 7, wherein the editing the second multimedia content through the first application in the case that the second input for moving the second multimedia content to the application icon of the first application is received, to obtain the first multimedia content comprises:

determining, in a case that the second input for moving the second multimedia content to the application icon of the first application is received, whether the first application is a first preset application; and editing the second multimedia content through the first application in a case that the first application is the first preset application, to obtain the first multimedia content.

10. The electronic device according to claim 9, wherein after the determining whether the first application is the first preset application, the computer program, when executed by the processor, causes the electronic device to further perform the following step:

forwarding the first multimedia content through the first application in a case that the first application is not the first preset application but is a second preset application.

11. The electronic device according to claim 7, wherein the performing target processing on the first multimedia content through the second application in the case that the first input for moving the first identification information to the application icon of the second application is received comprises:

forwarding the first multimedia content through the second application in a case that the first input for moving the first identification information to the application icon of the second application is received and the second application is a second preset application.

12. The electronic device according to claim 7, wherein the performing target processing on the first multimedia content through the second application in the case that the first input for moving the first identification information to the application icon of the second application is received comprises:

editing the first multimedia content through the second application in a case that the first input for moving the first identification information to the application icon of the second application is received, and the second application is not a second preset application but is a first preset application.

13. A non-transitory computer-readable storage medium storing a computer program, wherein the computer program, when executed by a processor, performs the following steps:

displaying first identification information over an application icon of a first application in a floating manner, wherein the first identification information corresponds to first multimedia content in the first application, and the first multimedia content is edited by the first application; and performing target processing on the first multimedia content through a second application in a case that a first input for moving the first identification information to an application icon of the second application is received;

wherein before the displaying first identification information over the application icon of the first application in the floating manner, the method further comprises: displaying second multimedia content in an interface of a target application, wherein the target application is the second application or a third application; and editing the second multimedia content through the first application in a case that a second input for moving the second multimedia content to the application icon of the first application is received, to obtain the first multimedia content;

wherein the second input comprises a first operation and a second operation of continuously dragging the second multimedia content;

the editing the second multimedia content through the first application in the case that the second input for moving the second multimedia content to the application icon of the first application is received, to obtain the first multimedia content comprises:

switching the interface of the target application to a desktop of the electronic device in a case that the first operation of dragging the second multimedia content to a preset area is received; and editing the second multimedia content through the first application corresponding to an application icon on a target location, in a case that the second operation of dragging the second multimedia content to the target position on the desktop is received, to obtain the first multimedia content, wherein the target position is a position corresponding to an application icon on the desktop.

14. The non-transitory computer-readable storage medium according to claim 13, wherein the performing target processing on the first multimedia content through the second application in the case that the first input for moving the first identification information to the application icon of the second application is received comprises:

displaying an interface of the second application comprising contact information, and forwarding the first multimedia content to a target contact, in a case that the first input for moving the first identification information to the application icon of the second application is received, wherein the target contact is a contact determined in the interface.

15. The non-transitory computer-readable storage medium according to claim 13, wherein the second input comprises a first operation and a second operation of continuously dragging the second multimedia content;

the editing the second multimedia content through the first application in the case that the second input for moving the second multimedia content to the application icon of the first application is received, to obtain the first multimedia content comprises:

switching the interface of the target application to a desktop of the electronic device in a case that the first operation of dragging the second multimedia content to a preset area is received; and editing the second multimedia content through the first application corresponding to an application icon on a target location, in a case that the second operation of dragging the second multimedia content to the target position on the desktop is received, to obtain the first multimedia content, wherein the target position is a position corresponding to an application icon on the desktop.

* * * * *